United States Patent [19]

LeTourneau

[11] Patent Number: 6,055,537
[45] Date of Patent: *Apr. 25, 2000

[54] COMPUTER STRUCTURE FOR STORING AND MANIPULATING INFORMATION

[75] Inventor: Jack J. LeTourneau, San Francisco, Calif.

[73] Assignee: Prime Arithmetics, Inc., San Francisco, Calif.

[ * ] Notice: This patent is subject to a terminal disclaimer.

[21] Appl. No.: 08/985,813

[22] Filed: Dec. 5, 1997

Related U.S. Application Data

[63] Continuation-in-part of application No. 08/486,351, Jun. 7, 1995, Pat. No. 5,787,432
[60] Provisional application No. 60/032,762, Dec. 11, 1996.

[51] Int. Cl.[7] .................................................. G06F 17/30
[52] U.S. Cl. ........................ 707/101; 707/102; 707/100
[58] Field of Search .................................. 707/100, 101, 707/102

[56] References Cited

U.S. PATENT DOCUMENTS

| | | | |
|---|---|---|---|
| 4,156,910 | 5/1979 | Barton et al. ............................. | 548/132 |
| 5,235,701 | 8/1993 | Ohler et al. ................................. | 707/1 |
| 5,274,821 | 12/1993 | Rouquie ................................... | 395/705 |
| 5,724,576 | 3/1998 | LeTourneau ............................. | 707/100 |
| 5,758,152 | 5/1998 | LeTourneau ............................. | 707/102 |
| 5,787,432 | 7/1998 | LeTourneau ............................. | 707/101 |

*Primary Examiner*—Anton W. Fetting
*Assistant Examiner*—Greta L. Robinson
*Attorney, Agent, or Firm*—Flehr Hohbach Test Albritton & Herbert LLP

[57] ABSTRACT

A computer structure for storing and manipulating information includes a processor, a table facility, a command facility and a memory. The table facility generates a table of prime numbers and associates a unique data structure with each prime number. The data structures include container data types such as heaps, strings, trees, tables, or any combination thereof. The table facility may further incorporate an ordered pair and a display font associated with each prime numbers. The command facility translates an inbound command from an external structure and provides a command to the processor. The processor manipulates the memory to provide a response to the inbound command. Advantages of the invention include a standard method and apparatus for creating, manipulating, and displaying data structures and container data types. The structures created are adaptable to imitate known data structures and are flexible enough to describe and manipulate new data structures.

5 Claims, 15 Drawing Sheets

```
16
┌─────────────────────────────────────────────┐
│ Program storage                          ~40│
│  ┌──────────────────────────────────────┐   │
│  │ Processor procedures              ~42│   │
│  │  ┌────────────────────────────────┐  │   │
│  │  │ Table facility              ~44│  │   │
│  │  │  ┌──────────────────────────┐ │  │   │
│  │  │  │ prime number generation ~46│  │   │
│  │  │  ├──────────────────────────┤ │  │   │
│  │  │  │ data structure generation ~48│ │   │
│  │  │  │  ┌────────────────────┐  │ │  │   │
│  │  │  │  │ data structure association ~50│
│  │  │  ├──────────────────────────┤ │  │   │
│  │  │  │ Icon facility (font generation) ~52│
│  │  │  │  ┌────────────────────┐  │ │  │   │
│  │  │  │  │ font association ~54│  │ │  │   │
│  │  │  ┌────────────────────────────┐  │   │
│  │  │  │ Command facility         ~56│  │   │
│  │  │  │  inbound command translation ~58│
│  │  │  │  command association      ~60│
│  │  │  │  command execution        ~62│
│  │  │  │  outbound command translation ~64│
│  ┌──────────────────────────────────────┐   │
│  │ Data storage                      ~66│   │
│  │   Table Storage                   ~68│   │
│  │   Ordered pair storage            ~70│   │
│  │   Data structure and Font storage ~72│   │
│  │   Association information         ~74│   │
│  │   Additional data                 ~76│   │
└─────────────────────────────────────────────┘
```

```
┌─────────────────────────────────────────────────┐
│ 16┐                                             │
│ ┌───────────────────────────────────────────┐   │
│ │ Program storage                           │──40
│ │ ┌───────────────────────────────────────┐ │   │
│ │ │ Processor procedures                  │─┼─42
│ │ │ ┌───────────────────────────────────┐ │ │   │
│ │ │ │ Table facility                    │─┼─┼─44
│ │ │ │  ┌──────────────────────────────┐ │ │ │   │
│ │ │ │  │ prime number generation      │─┼─┼─┼─46
│ │ │ │  ├──────────────────────────────┤ │ │ │   │
│ │ │ │  │ data structure generation    │─┼─┼─┼─48
│ │ │ │  │  ┌─────────────────────────┐ │ │ │ │   │
│ │ │ │  │  │ data structure association│─┼─┼─┼─50
│ │ │ │  ├──────────────────────────────┤ │ │ │   │
│ │ │ │  │ Icon facility (font generation)│┼─┼─┼─52
│ │ │ │  │  ┌─────────────────────────┐ │ │ │ │   │
│ │ │ │  │  │ font association        │─┼─┼─┼─54
│ │ │ ├───────────────────────────────────┤ │ │   │
│ │ │ │ Command facility                  │─┼─┼─56
│ │ │ │  ┌──────────────────────────────┐ │ │ │   │
│ │ │ │  │ inbound command translation  │─┼─┼─┼─58
│ │ │ │  ├──────────────────────────────┤ │ │ │   │
│ │ │ │  │ command association          │─┼─┼─┼─60
│ │ │ │  ├──────────────────────────────┤ │ │ │   │
│ │ │ │  │ command execution            │─┼─┼─┼─62
│ │ │ │  ├──────────────────────────────┤ │ │ │   │
│ │ │ │  │ outbound command translation │─┼─┼─┼─64
│ │ ├───────────────────────────────────────┤ │   │
│ │ │ Data storage                          │─┼─66
│ │ │ ┌───────────────────────────────────┐ │ │   │
│ │ │ │ Table Storage                     │─┼─┼─68
│ │ │ ├───────────────────────────────────┤ │ │   │
│ │ │ │ Ordered pair storage              │─┼─┼─70
│ │ │ ├───────────────────────────────────┤ │ │   │
│ │ │ │ Data structure and Font storage   │─┼─┼─72
│ │ │ ├───────────────────────────────────┤ │ │   │
│ │ │ │ Association information           │─┼─┼─74
│ │ │ ├───────────────────────────────────┤ │ │   │
│ │ │ │ Additional data                   │─┼─┼─76
│ │ │ └───────────────────────────────────┘ │ │   │
│ │ └───────────────────────────────────────┘ │   │
│ └───────────────────────────────────────────┘   │
└─────────────────────────────────────────────────┘
```

FIG. 3

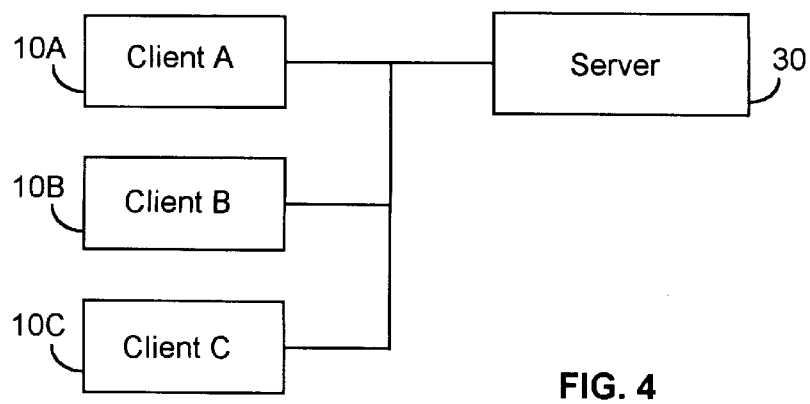

FIG. 4

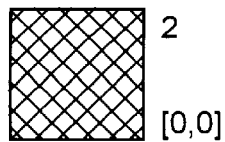 2 [0,0]
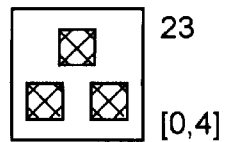 23 [0,4]
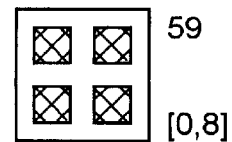 59 [0,8]
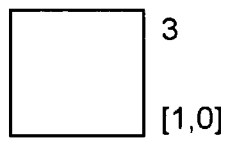 3 [1,0]
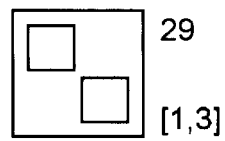 29 [1,3]
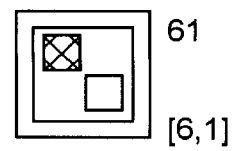 61 [6,1]
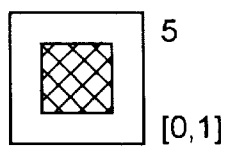 5 [0,1]
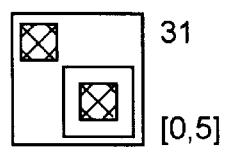 31 [0,5]
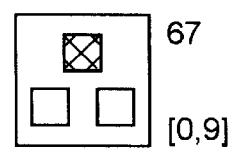 67 [0,9]
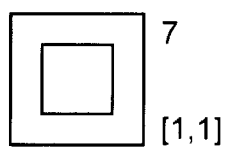 7 [1,1]
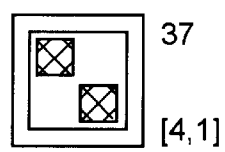 37 [4,1]
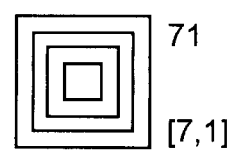 71 [7,1]
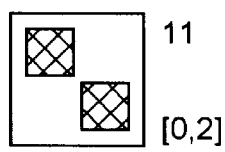 11 [0,2]
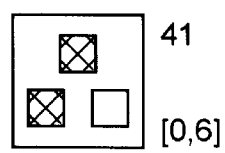 41 [0,6]
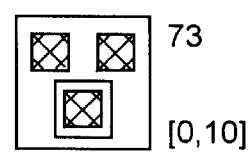 73 [0,10]
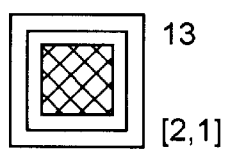 13 [2,1]
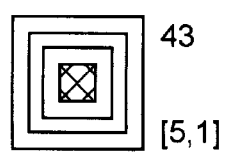 43 [5,1]
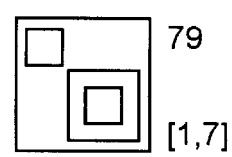 79 [1,7]
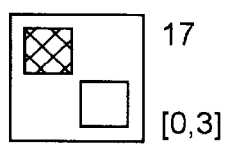 17 [0,3]
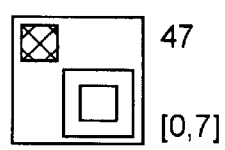 47 [0,7]
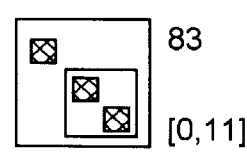 83 [0,11]
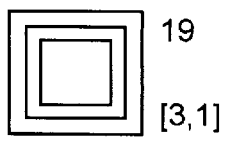 19 [3,1]
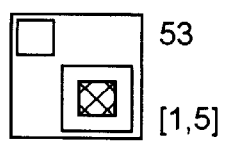 53 [1,5]
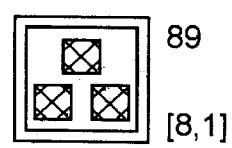 89 [8,1]
FIG. 5

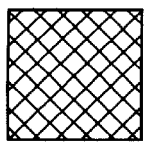 0
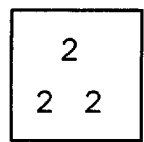 8
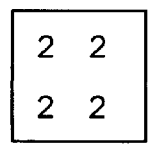 16
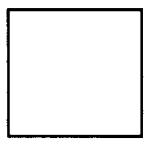 1
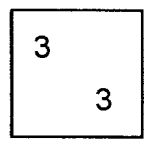 9
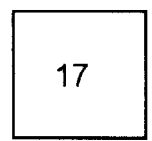 17
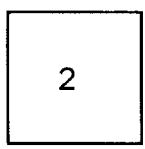 2
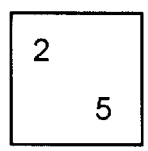 10
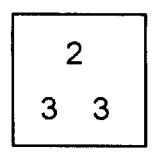 18
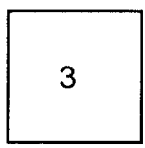 3
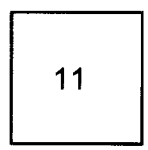 11
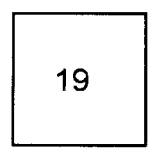 19
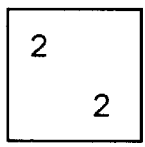 4
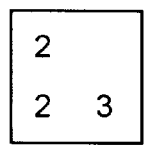 12
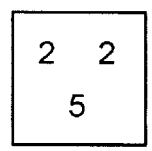 20
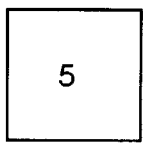 5
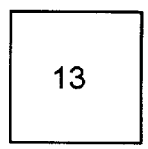 13
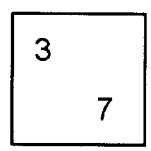 21
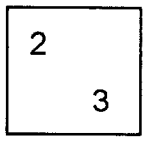 6
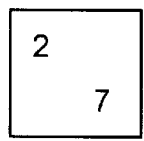 14
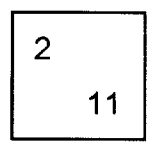 22
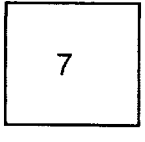 7
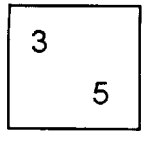 15
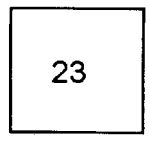 23
FIG. 7

| Q(Index) | Commutative Well-Formed Strings | Square Pairs | VT/W | VT/B | VT =P@F(VT/B) | Algebraic Terms Polish Prefix | Algebraic Terms English Infix |
|---|---|---|---|---|---|---|---|
| Q(0) | ٨ | [0,0] |  |  |  | c | c |
| Q(1) | [ ] | [1,0] | 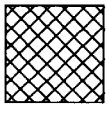 |  |  | #cc | (c#c) |
| Q(2) | [ ][ ] | [0,1] | 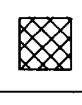 |  | 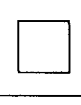 | #c#cc | (c#(c#c)) |
| Q(3) | [[ ]] | [1,1] | 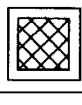 | 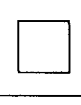 | 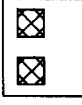 | ##ccc | ((c#c)#c) |
| Q(4) | [ ][ ][ ] | [0,2] | 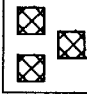 | 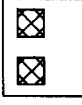 | 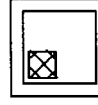 | #c#c#cc | (c#(c#(c#c))) |
| Q(5) | [[ ][ ]] | [2,1] | 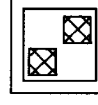 | 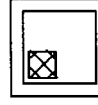 | 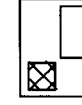 | ##c#ccc | ((c#(c#c))#c) |
| Q(6) | [ ][[ ]] | [0,3] | 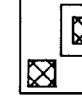 | 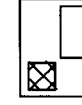 |  | #c##ccc | (c#((c#c)#c)) |
| Q(7) | [[[ ]]] | [3,1] | 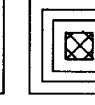 |  |  | ###cccc | (((c#c)#c)#c) |
FIG. 8A

| Q(Index) | Commutative Well-Formed Strings | Square Pairs | VT/W | VT/B | VT =P@F(VT/B) | Polish Prefix | English Infix |
|---|---|---|---|---|---|---|---|
| Q(8) | [ ][ ][ ][ ] | [0,4] | | | | #c#c#cc | (c#(c#(c#c))) |
| Q(9) | [[ ]][ ][ ] | [1,3] | | | | ##cc##ccc | ((c#c)#((c#c)#c)) |
| Q(10) | [ ][[ ][ ]] | [0,5] | | | | #c##c#ccc | (c#((c#(c#c))#c)) |
| Q(11) | [[ ][ ]][ ] | [4,1] | | | | ##c#c##ccc | ((c#(c#(c#c)))#c) |
| Q(12) | [ ][[[ ]]] | [0,6] | | | | #c#c##ccc | (c#(c#((c#c)#c))) |
| Q(13) | [[[ ]]][ ] | [5,1] | | | | ###c##cccc | (((c#(c#c))#c)#c) |
| Q(14) | [ ][[ ][[ ]]] | [0,7] | | | | #c###ccccc | (c#(((c#c)#c)#c)) |
| Q(15) | [[ ]][[ ][ ]] | [1,5] | | | | ##cc##c#ccc | ((c#c)#((c#(c#c))#c)) |

FIG. 8B

| Q(Index) | Commutative Well-Formed Strings | Square Pairs | VT/W | VT/B | VT =P@F(VT/B) | Algebraic Terms Polish Prefix | Algebraic Terms English Infix |
|---|---|---|---|---|---|---|---|
| Q(16) | [ ][ ][ ][ ][ ] | [0,8] | | | | #c#c#c#c#cc | (c#(c#(c#(c#(c#c))))) |
| Q(17) | [ [ ] ][ [ ] ] | [6,1] | | | | ##c##cccc | ((c#((c#c)#c)#c) |
| Q(18) | [ ][ [ ] ][ [ ] ] | [0,9] | | | | #c##cc##cc | (c#((c#c)#(c#c))) |
| Q(19) | [ [ [ [ ] ] ] ] | [7,1] | | | | ####cccc | (((((c#c)#c)#c)#c) |
| Q(20) | [ ][ [ ] ][ [ ] ] | [0,10] | | | | #c#c##c#cc | (c#(c#((c#(c#c))#c))) |
| Q(21) | [ [ ] ][ [ [ ] ] ] | [1,7] | | | | ##cc##ccc | ((c#c)#(((c#c)#c)#c) |
| Q(22) | [ [ ] ][ [ ] ][ [ ] ] | [0,11] | | | | #c##c#c#cc | ((c#c)#(c#(c#c))#c) |
| Q(23) | [ ][ ][ [ ] ][ [ ] ] | [8,1] | | | | ##c#c#c#ccc | ((c#(c#(c#(c#c)))#c) |
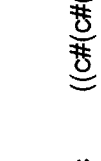
FIG. 8C Table 1

| | | | |
|---|---|---|---|
| 2 | Empty string | [0, 0] | |
| 3 | [] | [0, 0] | 2.0000 |
| 5 | [][] | [0, 1] | 1.0000 |
| 7 | [[]] | [1, 1] | 1.0000 |
| 11 | [][][] | [0, 2] | 1.0000 |
| 13 | [[]][] | [2, 1] | 1.0000 |
| 17 | [][[]] | [0, 3] | 1.0000 |
| 19 | [[[]]] | [3, 0] | 1.0000 |
| 23 | [][][][] | [0, 4] | 1.0000 |
| 29 | [[]][[]] | [1, 3] | .07500 |
| 31 | [][[][]] | [0, 5] | 1.0000 |
| 37 | [[]][][] | [4, 1] | 1.0000 |
| 41 | [][][[]] | [0, 6] | 1.0000 |
| 43 | [[[]][]] | [5, 1] | 1.0000 |
| 47 | [][[[]]] | [0, 7] | 1.0000 |
| 53 | [[]][[][]] | [1, 5] | 1.0000 |
| 59 | [][][][][] | [0, 8] | 1.0000 |
| 61 | [[][[]]] | [6, 1] | 0.8000 |
| 67 | [][[]][[]] | [0, 9] | 1.0000 |
| 71 | [[[[]]]] | [7, 1] | 0.8000 |
| 73 | [][][[][]] | [0, 10] | 1.0000 |
| 79 | [[]][[[]]] | [1, 7] | 0.8000 |
| 83 | [][[][][]] | [0, 11] | 1.0000 |
| 89 | [[]][][][] | [8, 1] | 1.0000 |
| 97 | [][][][[]] | [0, 12] | 1.0000 |
| 101 | [[][][[][]] | [2, 5] | 1.0000 |
| 103 | [][[[]][]] | [0, 13] | 1.0000 |
| 107 | [[]][[]][[]] | [1, 9] | 1.0000 |
| 109 | [][][[[]]] | [0, 14] | 1.0000 |
| 113 | [[[]][[]]] | [9, 1] | 1.0000 |
| 127 | [][[]][[][]] | [0, 15] | 1.0000 |
| 131 | [[][[][]] | [10, 1] | 1.0000 |
| 137 | [][][][][][] | [0, 16] | 1.0000 |
| 139 | [[[]][[]][] | [1, 11] | 0.8333 |
| 149 | [][[][[]]] | [0, 17] | 1.0000 |
| 151 | [[][[]][[]]] | [2, 7] | 0.8333 |
| 157 | [][[[][]][]] | [0, 18] | 1.0000 |
| 163 | [[[][][]]] | [11, 1] | 0.8333 |
| 167 | [][[[[]]]] | [0, 19] | 1.0000 |
| 173 | [[]][[[][]]] | [1, 13] | 0.8333 |
| 179 | [][[][[][]] | [0, 20] | 1.0000 |
| 181 | [[][[][]]] | [12, 1] | 0.8333 |
| 191 | [][[]][[[]]] | [0, 21] | 1.0000 |
| 193 | [[[[]]]] | [13, 1] | 0.8333 |
| 197 | [][][[][[]]] | [0, 22] | 1.0000 |
| 199 | [[]][[][][[]]] | [1, 15] | 0.8333 |
| 211 | [][[[][][]]] | [0, 23] | 1.0000 |
| 223 | [[]][[[]]] | [14, 1] | 0.8333 |
| 227 | [][][[[]][]] | [0, 24] | 1.0000 |
| 229 | [[[]]][[][]] | [3, 7] | 0.8333 |
| 233 | [][[][[][]]] | [0, 25] | 1.0000 |

Table 2

| | | c | |
|---|---|---|---|
| Q(0) | | c | 1.0000 |
| Q(1) | [ ] | #cc | 3.0000 |
| Q(2) | [ ][ ] | #c#cc | 2.5000 |
| Q(3) | [[ ]] | ##ccc | 2.5000 |
| Q(4) | [ ][ ][ ] | #c#c#cc | 2.3333 |
| Q(5) | [[ ][ ]] | ##c#ccc | 2.3333 |
| Q(6) | [ ][[ ]] | #c##ccc | 2.3333 |
| Q(7) | [[[ ]]] | ###cccc | 2.3333 |
| Q(8) | [ ][ ][ ][ ] | #c#c#c#cc | 2.2500 |
| Q(9) | [[ ]][[ ]] | ##cc##ccc | 2.2500 |
| Q(10) | [ ][[ ][ ]] | #c##c#ccc | 2.2500 |
| Q(11) | [[ ][ ][ ]] | ##c#c#ccc | 2.2500 |
| Q(12) | [ ][ ][[ ]] | #c#c##ccc | 2.2500 |
| Q(13) | [[[ ][ ]]] | ###c#cccc | 2.2500 |
| Q(14) | [ ][[[ ]]] | #c###cccc | 2.2500 |
| Q(15) | [[ ]][ ][[ ]] | ##cc#c#ccc | 2.7500 |
| Q(16) | [ ][ ][ ][ ][ ] | #c#c#c#c#cc | 2.2000 |
| Q(17) | [[ ][[ ]]] | ##c##cccc | 1.8000 |
| Q(18) | [ ][[ ]][[ ]] | #c##cc##ccc | 2.2000 |
| Q(19) | [[[[ ]]]] | ####ccccc | 1.8000 |
| Q(20) | [ ][ ][[ ][ ]] | #c#c##c#ccc | 2.2000 |
| Q(21) | [[ ]][[ ][ ]] | ##cc##c#ccc | 2.2000 |
| Q(22) | [ ][[ ][ ][ ]] | #c##c#c#ccc | 2.2000 |
| Q(23) | [[ ][ ][ ][ ]] | ##c#c#c#ccc | 2.2000 |
| Q(24) | [ ][ ][ ][[ ]] | #c#c#c##ccc | 2.2000 |
| Q(25) | [[ ][ ]][[ ][ ]] | ##c#cc##c#ccc | 2.6000 |
| Q(26) | [ ][[[ ]]] | #c###c#cccc | 2.2000 |
| Q(27) | [[ ]][[ ]][[ ]] | ##cc##cc##ccc | 2.6000 |
| Q(28) | [ ][ ][[[ ]]] | #c#c###cccc | 2.2000 |
| Q(29) | [[[ ]]][[ ]] | ###cc##cccc | 2.2000 |
| Q(30) | [ ][[ ]][[ ][ ]] | #c##cc##c#ccc | 2.6000 |

FIG. 10A-1

| | | | |
|---|---|---|---|
| Q(31) | [ ] [ ] [ [ ] [ ] ] | ##c##c#cccc | 2.2000 |
| Q(32) | [ ] [ ] [ ] [ ] [ ] [ ] | #c#c#c#c#cc | 2.1667 |
| Q(33) | [ [ ] ] [ [ ] [ ] ] | ##cc##c#c#ccc | 2.1667 |
| Q(34) | [ ] [ [ ] [ [ ] ] ] | #c##c##cccc | 1.8333 |
| Q(35) | [ [ ] [ ] ] [ [ [ ] ] ] | ##c#cc##cccc | 2.1667 |
| Q(36) | [ ] [ ] [ [ ] ] [ [ ] ] | #c#c##cc##ccc | 2.1667 |
| Q(37) | [ [ [ ] [ ] ] ] | ###c#c#cccc | 1.8333 |
| Q(38) | [ ] [ [ [ ] ] ] ] | #c####ccccc | 1.8333 |
| Q(39) | [ [ ] ] [ [ [ ] [ ] ] | ##cc###c#cccc | 2.1667 |
| Q(40) | [ ] [ ] [ ] [ [ ] [ ] ] | #c#c#c##c#ccc | 2.1667 |
| Q(41) | [ [ ] [ ] [ [ ] ] ] | ##c#c##cccc | 1.8333 |
| Q(42) | [ ] [ [ ] ] [ [ [ ] ] ] | #c##cc##cccc | 2.1667 |
| Q(43) | [ [ [ ] [ ] ] ] ] | ####c#ccccc | 1.8333 |
| Q(44) | [ ] [ ] [ [ ] [ ] [ ] ] | #c#c##c#c#ccc | 2.1667 |
| Q(45) | [ [ ] ] [ [ ] ] [ [ ] [ ] ] | ##cc##cc##c#ccc | 2.5000 |
| Q(46) | [ ] [ [ ] [ ] [ ] [ ] ] | #c##c#c#c#ccc | 2.1667 |
| Q(47) | [ [ ] [ [ [ ] ] ] ] | ##c###ccccc | 1.8333 |
| Q(48) | [ ] [ ] [ ] [ ] [ [ ] ] | #c#c#c#c##ccc | 2.1667 |
| Q(49) | [ [ [ ] ] ] [ [ [ ] ] ] | ###ccc##cccc | 2.1667 |
| Q(50) | [ ] [ [ ] [ ] ] [ [ ] [ ] ] | #c##c#cc##c#ccc | 2.5000 |
| Q(51) | [ [ ] ] [ [ ] [ [ ] ] ] | ##cc##c##cccc | 2.1667 |
| Q(52) | [ ] [ ] [ [ [ ] [ ] ] ] | #c#c###c#cccc | 2.1667 |
| Q(53) | [ [ [ ] ] [ [ ] [ ] ] ] | ###cc##c#cccc | 2.1667 |
| Q(54) | [ ] [ [ ] ] [ [ ] ] [ [ ] ] | #c##cc##cc##ccc | 2.5000 |

FIG. 10A-2

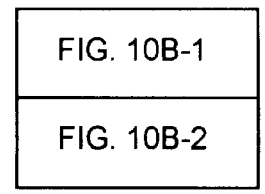

FIG. 10B

| | | | |
|---|---|---|---|
| Q(55) | [[][]][[][][]] | ##c#cc##c#c#ccc | 2.5000 |
| Q(56) | []][][[]]] | #c#c#c###cccc | 2.1667 |
| Q(57) | [[]][[[]]]] | ##cc####ccccc | 2.1667 |
| Q(58) | []][[]]][[]]] | ##c#c#c#c#ccc | 2.1667 |
| Q(59) | [[][][][][]] | ##c#c#c#c#ccc | 2.1667 |
| Q(60) | []][][[]][[]] | #c#c##cc##c#ccc | 2.5000 |
| Q(61) | [[[]][]]]] | ###c##ccccc | 1.8333 |
| Q(62) | []][][[]][]]] | #c##c##c#cccc | 2.1667 |
| Q(63) | [[]][[]][[]]] | ##cc##cc###cccc | 2.5000 |
| Q(64) | []][][][][][] | #c#c#c#c#c#cc | 2.1429 |
| Q(65) | [[][]][[[]][]]] | ##c#cc###c#cccc | 2.1429 |
| Q(66) | []][[]][[]][]] | #c##cc##c#c#ccc | 2.1429 |
| Q(67) | [[[]]][[]]] | ##c##cc##ccccc | 1.8571 |
| Q(68) | []][[[]]][]]] | #c#c##c##cccc | 1.8571 |
| Q(69) | [[]][[][][][]] | ##cc##c#c#c#ccc | 2.1429 |
| Q(70) | []][[][]][[]]] | #c##c#cc##ccccc | 2.1429 |
| Q(71) | [[[[[]]]]] | ####ccccccc | 1.5714 |
| Q(72) | []][][[]][[]] | #c#c#c##cc##ccc | 2.1429 |
| Q(73) | [[][][[][]]] | ##c#c##c#cccc | 1.8571 |
| Q(74) | []][[][][]]] | #c###c#c#cccc | 1.8571 |
| Q(75) | [[]][[]][]][[]] | ##cc##c#cc##c#ccc | 2.4286 |
| Q(76) | []][[[[]]]] | #c#c####ccccc | 1.8571 |
| Q(77) | [[[]]][[][]]] | ###ccc##c#c#ccc | 2.1429 |
| Q(78) | []][][[]][]]] | #c##cc###c#cccc | 2.1429 |
| Q(79) | [[[]][[]]]] | ###cc###ccccc | 1.8571 |
| Q(80) | []][]][[][]]] | #c#c#c#c##c#ccc | 2.1429 |
| Q(81) | [[]][[]][[]][[]] | ##cc##cc##cc##ccc | 2.4286 |
| Q(82) | []][[]][[]]] | #c##c#c##cccc | 1.8571 |
| Q(83) | [[]][[]][]]] | ##c##c#c#cccc | 1.8571 |
| Q(84) | []][[]][[]]]] | #c#c##cc###cccc | 2.1429 |
| Q(85) | [[]][][[]][]]] | ##c#cc##c##cccc | 2.1429 |
| Q(86) | []][[][]]]] | #c####c#ccccc | 1.8571 |
| Q(87) | [[]][[]][[]]]] | ##cc###cc##cccc | 2.1429 |
| Q(88) | []][]][[]][][]] | #c#c#c##c#c#ccc | 2.1429 |
| Q(89) | [[[][][]]]] | ###c#c#c#cccc | 1.8571 |

FIG. 10B-1

| | | | |
|---|---|---|---|
| Q(90) | []‍[[]]‍[[]]‍[[]‍[]] | #c##cc##cc##c#ccc | 2.4286 |
| Q(91) | [[[]]]‍[[[]‍[]]] | ###ccc##‍#c#cccc | 2.1429 |
| Q(92) | []‍[]‍[[]‍[]‍[]‍[]] | #c#c##c#c#c#ccc | 2.1429 |
| Q(93) | [[]]‍[[]‍[[]‍[]]] | ##cc##c##c#cccc | 2.1429 |
| Q(94) | []‍[[]‍[[[]]]] | #c##c###ccccc | 1.8571 |
| Q(95) | [[]‍[]]‍[[[]]]] | ##c#cc###ccccc | 2.1429 |
| Q(96) | []‍[]‍[]‍[]‍[]‍[[]] | #c#c#c#c#c##ccc | 2.1429 |
| Q(97) | [[]‍[]‍[]‍[[]]] | ##c#c#c##cccc | 1.8571 |
| Q(98) | []‍[[[]]]‍[[[]]] | #c##‍#ccc##‍#cccc | 2.1429 |
| Q(99) | [[]]‍[[]]‍[[]‍[]‍[]] | ##cc##cc##c#c#ccc | 2.4286 |
| Q(100) | []‍[]‍[[]‍[]]‍[[]‍[]] | #c#c##c#cc##c#ccc | 2.4286 |
| Q(101) | [[[]‍[]]‍[[]‍[]]] | ###c#cc##c#cccc | 2.1429 |
| Q(102) | []‍[[]]‍[[]‍[[]]] | #c##cc##c##cccc | 2.1429 |
| Q(103) | [[]‍[[]‍[]]]] | ##c###c#ccccc | 1.8571 |
| Q(104) | []‍[]‍[]‍[[[]‍[]]] | #c#c#c###c#cccc | 2.1429 |
| Q(105) | [[]]‍[[]‍[]]‍[[[]]] | ##cc##c#cc##‍#cccc | 2.4286 |
| Q(106) | []‍[[[]‍cc##‍[]]] | #c##‍#cc##c#cccc | 2.1429 |
| Q(107) | [[[]]‍[[]]‍[[]]] | ###cc##cc##cccc | 2.1429 |
| Q(108) | []‍[]‍[[]]‍[[]]‍[[]] | #c#c##cc##cc##ccc | 2.4286 |
| Q(109) | [[]‍[]‍[[[]]]] | ##c#c###ccccc | 1.8571 |
| Q(110) | []‍[]‍[]‍[]‍[[]‍[]‍[]] | #c##c#cc##c#c#ccc | 2.4286 |
| Q(111) | [[]]‍[[[]‍[]‍[]]] | ##cc###c#c#cccc | 2.1429 |
| Q(112) | []‍[]‍[]‍[]‍[[[]]] | #c#c#c#c##‍#cccc | 2.1429 |
| Q(113) | [[[[]]‍[]]]] | ####cc##ccccc | 1.8571 |
| Q(114) | []‍[[]‍cc##‍[]]]] | #c##cc###‍#ccccc | 2.1429 |
| Q(115) | [[]]‍[[]‍[]‍[]‍[]] | ##c#cc##c#c#c#ccc | 2.4286 |
| Q(116) | []‍[]‍[[[]]‍[[]]] | #c#c###cc##cccc | 2.1429 |

FIG. 10B-2

|        |                          |                      |        |
|--------|--------------------------|----------------------|--------|
| FIG. 10C-1 |
| FIG. 10C-2 |

FIG. 10C

| Q(117) | [[]][[]][[[][]]]         | ##cc##cc###c#cccc    | 2.4286 |
| Q(118) | []][[][]][]][]]          | #c##c#c#c#c#ccc      | 2.1429 |
| Q(119) | [[]]][[][[][]]]          | ###ccc##c##cccc      | 2.1429 |
| Q(120) | []][][][[]][[]][]        | #c#c#c##cc##c#ccc    | 2.4286 |
| Q(121) | [[]][][]][[][]][]        | ##c#c#cc##c#c#ccc    | 2.4286 |
| Q(122) | []][[]][[]]]]            | #c###c##ccccc        | 1.8571 |
| Q(123) | [[]][[][][[]]]           | ##cc##c#c##cccc      | 2.1429 |
| Q(124) | []][][[][[]][]]          | #c#c##c##c#cccc      | 2.1429 |
| Q(125) | [[][[]][[][[]][[][]]     | ##c#cc##c#cc##c#ccc  | 2.7143 |
| Q(126) | []][[]][[[]][[[]]]       | #c##cc##cc###cccc    | 2.4286 |
| Q(127) | [[][[]][[][]]]           | ##c##cc##c#cccc      | 2.1429 |
| Q(128) | []][][][][][][][][]      | #c#c#c#c#c#c#cc      | 2.1250 |
| Q(129) | [[]][[[]][]]]            | ##cc####c#ccccc      | 1.8750 |
| Q(130) | []][[]][]][[]][]]        | #c##c#cc###c#cccc    | 2.1250 |
| Q(131) | [[[][[][]]]]             | ###c##c#ccccc        | 1.6250 |
| Q(132) | []][[]][[]][[][]]        | #c#c##cc##c#c#ccc    | 2.1250 |
| Q(133) | [[]]][[[[]]]]            | ###ccc####ccccc      | 1.8750 |
| Q(134) | []][][[][[]]]]           | #c##c##cc##cccc      | 1.8750 |
| Q(135) | [[]][[][][[][][[]]]      | ##cc##cc##cc##c#ccc  | 2.3750 |
| Q(136) | []][][[]][[]]]           | #c#c#c##c##cccc      | 1.8750 |
| Q(137) | [[][][][][][]]           | ##c#c#c#c#c#ccc      | 1.8750 |
| Q(138) | []][[]][][[]][[]]        | #c##cc##c#c#c#ccc    | 2.1250 |
| Q(139) | [[[]][[][][]]]           | ###cc##c#c#cccc      | 1.8750 |
| Q(140) | []][[][[]][[[]]]         | #c#c##c#cc###cccc    | 2.1250 |
| Q(141) | [[]][[]][[[]]]]          | ##cc##c###ccccc      | 1.8750 |
| Q(142) | []][[[[]]]]]             | #c#####ccccccc       | 1.6250 |
| Q(143) | [[]][][][[[][]]]         | ##c#c#cc###c#cccc    | 2.1250 |
| Q(144) | []][][][][[[]][]]        | #c#c#c#c##cc##ccc    | 2.1250 |
| Q(145) | [[][]][[[]][[]]]         | ##c#cc###cc##cccc    | 2.1250 |
| Q(146) | []][[]][[][[]]]          | #c##c#c##c#cccc      | 1.8750 |
| Q(147) | [[]][[[]]][[[]]]         | ##cc###ccc###cccc    | 2.1250 |
| Q(148) | []][[[]][[][]]]          | #c#c###c#c#cccc      | 1.8750 |
| Q(149) | [[]][[][]]]]             | ##c##c##ccccc        | 1.6250 |
| Q(150) | []][[]][[][]][[[]]]      | #c##cc##c#cc##c#ccc  | 2.3750 |

FIG. 10C-1

| | | | |
|---|---|---|---|
| Q(151) | [[[][]][[[]]]] | ###c#cc##ccccc | 1.8750 |
| Q(152) | []][][[[[]]]] | #c#c#c###ccccc | 1.8750 |
| Q(153) | [[]][[]][[][[]]] | ##cc##cc##c##cccc | 2.1250 |
| Q(154) | []][[[]]][[][][]] | #c###ccc##c#c#ccc | 2.1250 |
| Q(155) | [[][]][[][[][]]] | ##c#cc##c##c#cccc | 2.1250 |
| Q(156) | []c#][[]][[[]]] | #c#c##cc###c#cccc | 2.1250 |
| Q(157) | [[]][c[]][[]]] | ##c#c##cc##cccc | 1.8750 |
| Q(158) | []][[[]][[[]]]] | #c###cc##cccccc | 1.8750 |
| Q(159) | [[]][[[]][[][]]] | ##cc###cc##c#cccc | 2.1250 |
| Q(160) | []][][[][][[][]] | #c#c#c#c#c##c#ccc | 2.1250 |
| Q(161) | [[[]]][[][][][]] | ###ccc##c#c#c#ccc | 2.1250 |
| Q(162) | []][][[[]][[]][[]]] | #c##cc##cc##cc##ccc | 2.3750 |
| Q(163) | [[[[][]]]] | ####c#c#ccccc | 1.6250 |
| Q(164) | []][][[]][][[]] | #c#c##c#c##cccc | 1.8750 |
| Q(165) | [[]][[]][]][[][][]] | ##cc##c#cc##c#c#ccc | 2.3750 |
| Q(166) | []][[]][[][]]] | #c##c##c#c#cccc | 1.8750 |
| Q(167) | [[][[[]]]] | ##c####cccccc | 1.6250 |
| Q(168) | []][][[]][[[]]] | #c#c#c##cc###cccc | 2.1250 |
| Q(169) | [[[][]][[[][]]] | ###c#ccc##c#cccc | 2.1250 |
| Q(170) | []][c[]][[][[]]] | #c##c#cc##c##ccc | 2.1250 |
| Q(171) | [[]][[]][[[[]]]] | ##cc##cc###ccccc | 2.1250 |
| Q(172) | []][[[]][]]] | #c#c####c#ccccc | 1.8750 |
| Q(173) | [[]]][[][]]]] | ###cc###c#cccccc | 1.8750 |
| Q(174) | [c[][]][[[]][[]]] | #c##cc##cc##cccc | 2.1250 |
| Q(175) | [[]][[][]][[[]]] | ##c#cc##c#cc##cccc | 2.3750 |
| Q(176) | []][]][[][][]] | #c#c#c#c##c#c#ccc | 2.1250 |
| Q(177) | [[]][[][][][][]] | ##cc##c#c#c#c#ccc | 2.1250 |

FIG. 10C-2

COMPUTER STRUCTURE FOR STORING AND MANIPULATING INFORMATION

RELATED APPLICATIONS

This application is a continuation-in-part of U.S. Ser. No. 08/486,351 filed Jun. 7, 1995 now U.S. Pat. No. 5,787,432, incorporated herein by reference; and this application claims priority to U.S. Provisional No. 60/032,762 filed Dec. 11, 1996, incorporated herein by reference.

FIELD

The present invention is in the field of digital computers. More particularly, it relates to a computer structure for storing and manipulating information.

BACKGROUND

The origins of computers and computer science are rooted in the concepts of algorithms and data structures. To date, the theoretical emphasis has been on the generation and efficient implementation of algorithms. Data structures, which originally included only numbers, were theoretically less well understood although known to be critical to the automation of various mechanical processes. Only recently has a theory of data structures, both as a vehicle to store information and as a tool to solve problems, been recognized and a general methodology of data structures been developed.

The lack of understanding of data structures and their efficient implementation, manipulation and display has led to many difficulties. Perhaps the most important of these difficulties is the almost complete lack of standards for creating and manipulating data structures. Presently, every computer programmer defines and uses his or her own methods for creating and manipulating data structures. Although particular data structures such as binary trees and linked lists have acquired a certain uniformity of style for their creation and manipulation, there is still no standard even for these common data structures.

This non-uniformity has several large costs associated with it. First, as every programmer must create their own data structures separately every time a program is written, a great deal of effort is expended recreating the wheel with each new program. Along with the effort wasted in recreating the data structures, an associated problem is debugging the code creating the data structure every time a new program is written. In addition, as each program is created in a specific operating environment or with a specific operating environment in mind, and programs which operate on one computer may be restricted to only that type of computer. The expense of continually rewriting the same software and the limitations imposed by non-portable software are serious concerns.

This problem also appears in the lack of a consistent and efficient method for implementing abstract container data types and their associated query languages. Examples of container data types include heaps, strings, trees (also called bags), tables, or any combination thereof. These modern data types are naturally used to store and query data, especially when the structure of the data is only partially known or is not known at all.

Container types are the common structures used to create a distinction between object and context, especially at the most primitive levels of distinguishing files from directories. The construction of a query language for bags requires the construction of a container data model, including appropriate operations or methods. The reason for the lack of a natural container model is the difficulty of immediate linguistic self-reference. Most contemporary techniques to solving this difficult problem begin with a naive categorical or first-order query language supporting an atomic or base level set of bag operations, such as singleton formation and additive union, as well as counting and tuple methods. One consequence of the first-order or categorical technique is the inability of the resulting query languages to define, create, or test within themselves certain critically important capabilities such as creating a transitive closure of a multiset, testing a finite graph for acyclicity or connectivity, or testing whether a finite bag has an even number of elements. A second consequence of the first-order or categorical technique is that at some point in the construction it becomes necessary to interpret natural numbers within the query language as a form of self-reference. The commonly adopted solution to this is to move tokens to their exponents and then perform the arithmetic at that level. This type of exponential encoding is not efficient.

Due to the limitations of general first-order logic and the associated categorial views and the innate combinatoric difficulty of the complexity problems involved, many programmers have moved from formally defined methods when addressing this problem of query languages for bags and have retreated to programming with ad hoc engineering solutions. This technique is, of course, incompatible with the goal of universal logic or distributed objects.

What is needed is a standard method and apparatus for creating, manipulating, and displaying data structures and container data types. The structures created should be adaptable to imitate, if not recreate, known data structures, should be flexible enough to describe and manipulate new data structures, and the form of the structures should facilitate operations such as comparison of and addition to the data structures. The apparatus which creates the data structure should also be able to display them in a readily comprehensible format.

SUMMARY

A computer structure for storing and manipulating information according to an embodiment of the invention includes a processor, a table facility, a command facility and a memory. The table facility generates a table of prime numbers and associates a unique data structure with each prime number. The data structures include container data types such as heaps, strings, trees, tables, or any combination thereof. The table facility may further incorporate an ordered pair and a display font associated with each of the prime numbers. The command facility translates an inbound command from an external structure and provides a command to the processor. The processor manipulates the memory to provide a response to the inbound command.

Advantages of the invention include a standard method and apparatus for creating, manipulating, and displaying data structures and container data types. The structures created are adaptable to imitate known data structures and are flexible enough to describe and manipulate new data structures.

BRIEF DESCRIPTION OF THE DRAWINGS

FIG. 3 depicts the memory of FIG. 1;

FIG. 4 depicts a client/server configuration according to an embodiment of the invention;

FIG. 5 is a font table according to an embodiment of the invention;

FIG. 7 is a font table according to an embodiment of the invention;

FIGS. 8A–C are a font translation table according to an embodiment of the invention;

FIG. 9 is a Table 1 referenced in the specification; and

FIGS. 10A–C is a Table 2 referenced in the specification.

GLOSSARY

Figure 1:
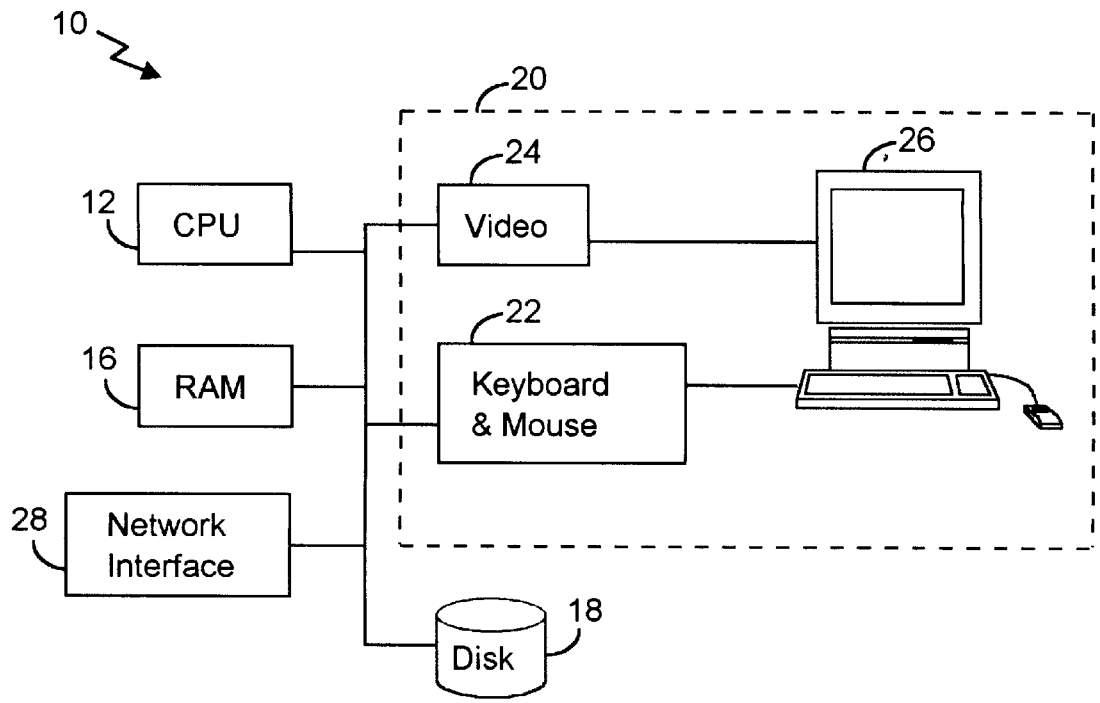
FIG. 1 depicts a computer configured according to an embodiment of the invention.

This glossary contains terms used in this specification. The reader is urged to reference this glossary if any term used in the specification is unclear.

algebraic—having to do with algebra and especially algebraic operations.

Bachus/Naur normal form—a method for describing compiler syntax relationships invented by John Bachus and Edwin Naur of IBM in 1959. Used as the input notation form for the UNIX compiler tool, yacc.

base—(for a radix positional notation for natural numbers). The natural number b, used in the $c_0 b^0 + c_1 b^1 + c_2 b^2 \ldots + c_k b^k$ description of a number.

binary operator—any operation that requires exactly two input values before computing an output value.

binary—having to do with two.

binary string—any finite string of 0's and 1's, including the empty string. The collection of all binary strings is usually denoted by the symbols $\{0, 1\}^*$.

Boolean natural number—either the natural number 0 or 1.

bounded resource quantification—quantification restricted by some easily expressed limit or bound, usually in an attempt to control the combinatorial complexity of the computation.

constant—a linguistic token with a fixed meaning or value.

decidable set/relation—a set or relation which can be analyzed by a computer such that the computer can answer any yes or no question regarding set/relationship membership. Compare recursively enumerable set/relation.

dimension—(of a syntactic descriptive notation for natural numbers) the natural number, b, which is two more than the number of (totally) free generators of the syntactic scheme.

empty set—the set with no elements; usually denoted by 0 or null.

empty string—the string of length 0 usually denoted by 0 or nil.

finite multi set—a multi set that has a finite number of elements.

finite sequence—a finite ordered collection of possibly repeating elements. Each element of the Sequence is said to have a natural number position, or index, within the sequence.

first-order logic—a standard formal language used by mathematicians to describe the foundations of mathematics. Allows all Boolean truth table operations as well as quantification over some universe of possible values. Contrasted with second-order logic which includes first-order logic and allows quantification over the subsets or subrelations of the universe of meaning or value.

generators—refers to a set of elements in an algebraic structure used as a base to construct all the other elements of the algebra by using the algebra's operators. For example, zero, by itself, is a generator of the set of all natural numbers, using the operation of successor. 1, by itself, is a generator of the set of all positive natural numbers under the two operations of prime enumeration (see Kleene prime enumeration operation) and multiplication.

induction—a method used to construct sets or relations based on the idea of specifying the legal or available starting elements of the construction and the rules of continuation. Usually associated with methods of proof for number theoretic theorems and proofs of correctness for program construction.

isomorphism—a relationship of equality between (similar) algebraic or relational structures. Defined by some 1-1 function between the universes of the two structures that preserves the operations and relations of the structures.

Kleene prime enumeration operation—the monadic operation defined on either the positive natural numbers or all the natural numbers that lists in arithmetic order, the prime natural numbers. Usually denoted by P or Q. For example, $P(1)=2, P(2)=3, P(3)=5, \ldots$ or $Q(0)=2, Q(1)=3, Q(2)=5, \ldots$; with context determining the appropriate meaning. Named after the 20th century American mathematician Steven S. Kleene who first studied this operation.

model—refers to an algebraic structure containing a non-empty universe and a certain number of operation and relations defined on the universe.

monadic operator—any operation that requires exactly one input value before computing an output value.

multi set—an unordered collection of elements which allows multiple copies of the same element to be contained within the set-like object.

numeral—an alphanumeric or iconic name for a number.

numeral system—a numeral representational scheme, usually for the natural numbers, and one or more algorithms, based on the representational system, for manipulating the numerals.

natural number—any of the numbers usually named by common Arabic ciphers 0, 1, 2, 3, 4, . . . . Contrasted with the integers which are natural numbers with a directional sign, the rational or fractional numbers, the real or decimal numbers, or any of a number of other kinds of numbers.

prenex normal form—refers to first-order logic formulas wherein all quantifiers precede any and all Boolean operations on atomic terms or parts.

parameter—a linguistic token with a variable meaning or value.

prime natural number—a natural number with exactly two divisors: i.e. any of the numbers usually named by 2, 3, 5, 7, 11, 13, . . . .

quantification—either looking within a specified place for an instance or example of some element that satisfies a specified relationship (existential quantification) or looking within a specified place to discover if all the elements of the specified place satisfy a specific relationship (universal quantification).

Quintessential Boolean Prolog—(QBP) A high-order logic programming language based on first-order logic and bounded Boolean multiset evaluation.

relational—having to do with relation symbols or relationships between elements. For example, the symbol '<' usually denotes the less than relation between natural numbers, as contrasted with the common arithmetic operation symbols + and *.

radix positional notation—our usual numeral system for the natural numbers; based on the notion of a gear shaft and leading to a geometric series description for natural numbers. For example, in base 10, each column represents a successive power of 10.

recursively enumerable set/relation—a set or relation which can be analyzed by a computer to the extent that the computer will answer truthfully any positive membership query and will never lie, even when a negative answer cannot be given, on no membership questions. If both a set/relation and its set-theoretic compliment within some universe are both recursively enumerable then the net/relation is called a decidable set/relation.

set—an unordered collection of elements, no two of which are identical.

subelement—refers to an element of an element. Usually used in the context of sets or strings where the more precise meaning refers to set-theoretic elements of elements or sub strings of substrings (of strings).

syntactic algebraic notation—an algebraic numeral system for the natural numbers based on the ideas in the publication titled "The Elementary Theory of Object Oriented Arithmetic" by Jack J. LeTourneau (published on the Internet at site http://www.primearithmetics.com). Each syntactic notational system has a dimension, an idea corresponding to the base idea of radix notation.

k-tuple—refers to collections of finite sequences of fixed length k; ex. 2-tuples, 3-1 tuples, 17-tuples, 23-tuples, etc.

unary operator—any operation that requires exactly one input value before computing an output value.

variable—a linguistic token used to indicate a range of meaning or value.

virtual—refers to a data structure software construction which allows the user to perceive and interact with the data structure as if it were infinite, even though the computer, being a finite storage device, stores at most part of the data structure.

witness—refers to the value of some existential quantifier.

yacc—a UNIX tool for the creation of compilers (stands for 'yet another compiler compiler').

DETAILED DESCRIPTION

The invention is described with reference to specific configurations and methods. A person skilled in the art will recognize that the invention can be performed with a variety of configurations and methods as defined by the claims.

FIG. 1 depicts a computer 10 configured according to an embodiment of the invention. The computer includes a processor (CPU) 12, memory 12, a disk 18 a user interface 20 and a network interface 28. The configuration of the user interface, the processor and the memory are particularly described in the specification.

Figure 2:
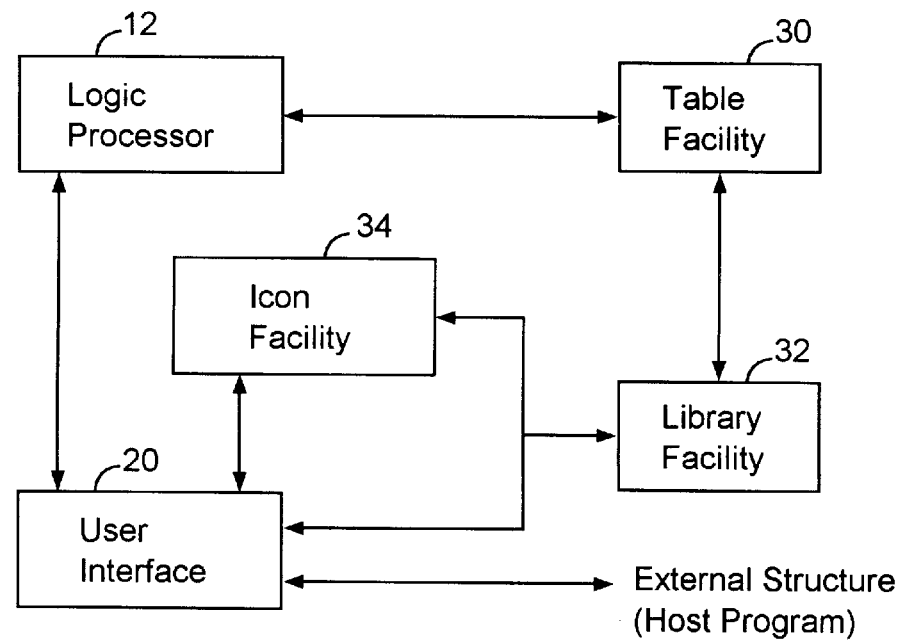
FIG. 2 depicts a computer logically configured according to tasks performed by an embodiment of the invention.

FIG. 2 depicts a computer logically configured according to tasks performed by an embodiment of the invention. Similar reference numerals are used for the processor 12 and user interface 20. Additionally, a table facility 30, library facility 32 and icon facility are provided to perform procedures according to the invention, described below.

It is well known that finite rooted connected (unordered) tree structures are the most fundamental non-linear finite data structure used within the construction of computer algorithms. Today, however, operating systems, databases, and browsers are being developed to support new smart complex object interactions and the applications that depend upon the manipulation of complex container or bulk abstract data types. These new data types and structures are especially important in geographic information systems, multimedia media authoring environments, CAD systems, document and code libraries, and a variety of world wide web distributed application and this new bread of application appear to require new and appropriately complex data structures, in particular data structures more complex than simple trees.

To support these newer applications, complexly structured trees or labeled trees in a great number of variations have been proposed as an appropriate or even as the/a single universal data structure appropriate for nested or hierarchical systems.

For example, one speciality tree description that has been proposed as a universal model for the control of spacial data is the R-Tree and it's closely related cousins, the Linked R-Trees. Other and different data structures have also been proposed as the single universal data structure from which we can easily built, in an extensible fashion, all other data structures.

A different and more mathematical approach would be to use some classic well known or otherwise common data structure with a limited number of methods and then show by reduction that all other data structures could be constructed from the given classic starting structures using only the limited number of methods.

The approach taken here is a reduction to classic structures argument. We use bags or finite multisets as our base class of universal elements or objects. In particular we restrict ourselves to referring to natural number labeled finite multisets or those natural number labeled finite multisets where the finite multiset can be explicitly defined using only the two matched bracketing symbols, left or "[" and right or "]". This set of objects is a simpler universal set of objects than those used by others.

In addition to using a simpler set of base or universal objects, we use a reduced class of only three simple multiset or bag primitives and we observe, as part of this invention, that from this set of three primitives that all other recursively enumerable predicates are first-order or elementarily definable, thus showing that our finite multiset primitives are universal. Compare "The Elementary Theory of Finite Multisets" written by the inventor (supra).

The three primitives used in this invention are: (1) the ability to name, and hence use, the empty finite multiset null; (2) the ability to name, and hence use, the binary finite multiset operation {x}Uy or singleton x union y, and (3) the ability to name the test, and hence use, the Boolean value returned from the binary test of whether or not two natural number labeled finite multisets, are equal as tree graphs.

We note that with just these three primitive symbols that the syntax of the underlying equational language would normally be encoded in a two bit fashion. Part of the invention discloses a semantically equivalent one bit numerical encoding using the symbols 0, and #, with equality being interpreted in an absolute or numerical fashion.

In the sections below we will present the details and definitions necessary to make precise our representation methods for describing labeled trees and the implementation techniques associated with this representation. This is described under the heading Main Construction. Following this first section are two applications of the work.

The first application is a method for representing natural numbers as two character sequences, with zero represented as 0, and with concatenation (of commutative well formed strings) representing ordinary multiplication, except when either x or y is either zero or a power of 2.

The second application is a method for transmitting finite sequences of natural numbers as a two character sequence that is compatible with point to point wire transmission.

A. The Main Construction

Converting Labeled Trees into a One Bit Representation

We will assume that our label variable, i, for finite rooted unordered trees always ranges over the entire set of all natural numbers, including the natural number zero.

Each natural number node labeled finite rooted connected unordered tree, hereafter a Labeled Tree, LT, is naturally and by conventional wisdom represented as a finite well formed strings of matched left and right parenthesis, with a single natural number label associated with each left hand root parenthesis.

For example, an edge labeled tree whose root is labeled 3, and which has the three subtrees as shown below is naturally represented by either of the sequences of displayed symbols:

(3(0(2))(1(3))(0(0)(1))) or (11(0(10))(1(11))(0(0)(1))).

To convert any labeled finite tree, LT, into a binary string follow the follow steps:

(1) Write LT as a well formed sequence of parenthesis with each left parenthesis associated with a natural number label. Call this output string LT1;

(2) Change each natural number k of LT1 that occurs within the exact context or sequence of being a most interior symbol, that is where k is part of a well formed sequence "(k)", to the number k+1 and call the output string LT2. This operation is sometimes called taking the Successor at the Frontier of the tree LT1;

(3) Replace label i within LT2 with the 2 i long sequence "[][][] . . . []". Call the output string that results from this process string LT3;

(4) Remove the outer parenthesis of the string LT3 obtaining the desired representation of the original labeled tree (of labeled trees).

The labeled tree above is translated by step 2 to the string shown below:

(3(0(3)) (1(4)) (0(1)(2)));

then by step 3 to (000((000))(0(0000))((0(00)));

and finally by step 4 to

000((000))(0(0000))((0(00)).

In this way every labeled tree (of labeled trees) is converted into a unique (up to commutative rearrangement) well formed parenthesis string and any such well formed parenthesis string corresponds to some labeled tree (of labeled trees). This translation is also a 1-1 matching.

Because of step 3 above, the encoding of natural numbers is said to be "tally" or O(n) efficient. This is also visually depicted in the trees with pebbles notation of Visual Type, see FIGS. 5 and 8A–C. Because of the internal folding of Visual Type, this limitation can be overcome with the natural number labels be O(log(n)) efficient.

B. The Fundamental Prime-tree Association

A natural number is called a prime natural number if and only if the number has exactly two distinct natural number divisors. Thus one is not a prime natural number and two is the first prime natural number. Different enumerations of prime natural numbers and tables of prime natural numbers, including the standard arithmetic enumeration, Q, are known. The kth prime natural number in the natural additive ordering of the prime natural numbers, <2, 3, 5, 7, 11, . . . >, is denote by Q(k). This monadic operation that lists the prime natural numbers is sometimes known as the Kleene prime enumeration operation.

Also note that various enumerations of the finite tree structures are also known, including the standard lexical ordering and the arithmetic enumeration of F. Göbel,

<{}, {{}}, {{{}}}, . . . , {{{{}}}}, . . . >.

Below we define, in a recursive way, a new enumeration or association of prime natural numbers coupled with finite trees. This enumeration is neither an enumeration of primes by themselves nor an enumeration of the simple trees by themselves, but rather it is an enumeration of the prime natural numbers with each prime natural number uniquely associated or coupled with a tree. It is exactly this association of primes and trees that forms a core of the present invention. See FIGS. 8A–C and Table 1.

The ordering we will describe below is a surjection and thus by the observation above also indirectly enumerates all natural number labeled trees. See FIGS. 8A–C.

The table facility 30 is responsible for generating the list of primes and for associating the trees. This Prime Arithmetic Ordering is defined as follows: [note that the recursion below is understood to be a structural or top down ordered recursion]

Q(0) or 2 is associated with the equivalence class of the empty string or {nil};

Q(1) or 3 is associated with the equivalence class of the string [ ];

Q(2(x)) is associated with the equivalence class of the string [ ]_PAO(x), where PAO(x) is associated with x;

Q(Q(x)) is associated with the equivalence class of the string [_PAO(x)_], where PAO(x) is associated with x; and Q(Q(x)*y) is associated with the equivalence class of the string [_PAO(x)_]_PAO(y), where PAO(x) is associated with x and where PAO(y) is associated with y.

The association defined above is displayed as Table 1.

We shall next see how this enumeration or ordering defines the Prime Square Pair data structures, [a, b], the data structure which we will use internally within the invention to store labeled trees (of labeled trees).

C. Prime Square Pairs

Since the commutative well formed parenthesis sets are the smallest set that contains the empty string and which is at the same time closed under the binary string operation [_x_]_y it follows by induction that any ordering of the finite trees automatically induces a numerical pair algebra that is isomorphic to the original string algebra. In particular, for any prime natural number Q(k), the naturally associated numerical Square Pair for Q(k) under the ordering is defined above is [k, 1], a pair which is guaranteed to contain the same or fewer bits than the original prime.

The Square Pairs associated with each of the natural prime/tree pairs is enumerated as Column 2 of Table 1 and column 3 of FIGS. 8A–C.

Note that Column 3 of Table 1 shows that the ratio of the number of total bits used in some representing Square Pair divided by the number of bits in the index of the associated prime is always less than or equal one. Note also that the first coordinate of any Square Pair must be the index of a prime natural number that divides the enumeration number of the prime/tree pair and thus there are, on the average, only loglog(x) divisors of any natural number x and thus there are on the average only loglog(x) Square Pair alies. In the table generated in Table 1 we have used as the left coordinate of each square pair the smallest possible choice (or the so called method of lazy extraction).

D. The Transitive Closure Query

In the standard approach to database modeling, relations are assumed to be sets with no duplication of elements within the set allowed. For many modern applications, especially World Wide Web applications involving the querying of unstructured data, or data whose database organizing scheme is unknown or only partially known, this fundamental assumption concerning the allowance of duplicates is an unreasonable assumption. In the face of this problem and the known costs of duplicate elimination in relational data bases, many database researchers have turned to the study of bags or multisets that allow duplicates and the search for basic underlying manipulation algebras that can be used to describe and control these modern bag languages.

Seen within this context one of the main tasks of computer science is to discover, or define, data representation models whose associated query languages are both richly expressive, in terms of the constructs that are first-order definable within the language, while at the same time being tractable in its abstract complexity measures.

Most contemporary approaches to this problem begin with a naive categorical or first-order view of bags and query language and support both set or bag operations as well as tuple and counting operations at the bottom or atomic level.

One consequence of this general categorical or first-order approach is the inability of the resulting query languages to define, create, or test within the language, certain critically important functions such as creating the transitive closure of a multiset, testing a graph for acyclicity or connectivity, or even to test whether or not a binary tree is balanced.

The approach taught by PRIM ARITHMETICS begins with a naive set theoretic view which is more constructive by nature and limits the symbol base of our language to a fixed similarity type or signature using just four symbols: one constant symbol, c, one monadic operation symbol, ^, one binary operation symbol, #, and the binary Boolean operation symbol of equality, =.

PRIME ARITHMETICS then further restricts the general model by insisting that the model satisfy an infinite number of equations within this <1, 1, 1>-similarity type. These axioms define a core model up to isomorphism. It is our assumption that this core model is the same as the model with which we initially focus our naive attention.

We then show how the primary objects and operations of this equationally defined model can also be interpreted over the universe of (equivalence classes of) ordered pairs of natural numbers, [a, b], allowing eventual storage of the data structures as single bits within the a-rows and b-columns of a storage table.

This style of equational presentation is similar in spirit to the presentation of both Boolean Algebra, BA, by George Boole and of Relational Algebra, RA, by Alfred Tarski, but is more constructive in the sense that an efficient interpretation of the model, the square pair interpretation, is also presented.

One advantage of this arithmetic string processing approach is that by choosing the finite simple bags as the only ontological objects, a simple and novel arithmetic naturally arises as inherent within the representation itself As a result it follows that the natural query language defined for these finite structures includes many of the functionalities difficult or impossible to define using the more general approach. These include the ability to define the transitive closure of a multiset, a test for acyclicity of graphs, a test for connectivity of graphs, and a test for balanced binary trees.

Since in the world of real applications all data structures completely stored within any computer must be finite, this restriction to the manipulation of finite structures appears to not limit our approach. To the contrary, by focusing on a single structure that contains the essence of all finite structures, we gain control of a larger cognitive space while still effectively controlling the minimal syntax of the associated language.

Listed below are the equational axioms that define the semantics of the core finite multiset model of our study. In the string interpretation the constant represents of the null string, ^ represents the monadic operation of parallel successor at the frontier or adding one more element to each frontier position, and # represents insertion or the formation of the string [_x_]_y from the strings x and y. See Table 1 and FIGS. 8A–C.

After presenting these equations we define a semantically equivalent Square Pair model including each of the four primitive operation symbols contained within the equations of our data model. Finally we end this section by presenting recursive pseudocode that arithmetically constructs, from the input Square Pair representation of a simple finite multiset, the Square Pair notation for the transitive closure of the input multiset. The natural simplicity of this arithmetic recursion shows the power of Prime Arithmetics string processing technology.

The model we point to in the equations below can be described as the Herbrand, Birkhoff, Tarski, or Core model of the equational axioms displayed below. In this particular case we assume that there are at least four symbols: "c", "^", "#", and "=" such that when x, y, and z are constants or terms of the system, the symbols satisfy the following conditioned or constrained equational axioms. This model is sometimes called the Boolean finite multisets, BFMS or Visual Type model:

(x#c)=x#(c#c), when x not c;
(x#(y#z))=(y#(x#z));
c^=c;
(c#c)^=(c#(c#c));
(c#y)^=(c#y^), when y is a FRA term;
(x#y)^=(x^#y), when y is a FRA term, x is not c; and
(x#y)^=(x#y^), when y not a FRA term, where FRA represents the set of all fully right associated <1,0,1>terms, that is FRA is the set shown below:

{c, (c#c), (c#(c#c)), (c#(c#(c#c))), (c#(c#(c#(c#c)))), (c#(c#(c#(c#(c#c))))), (c#(c#(c#(c#(c#(c#c)))))), . . . }.

Figure 6:
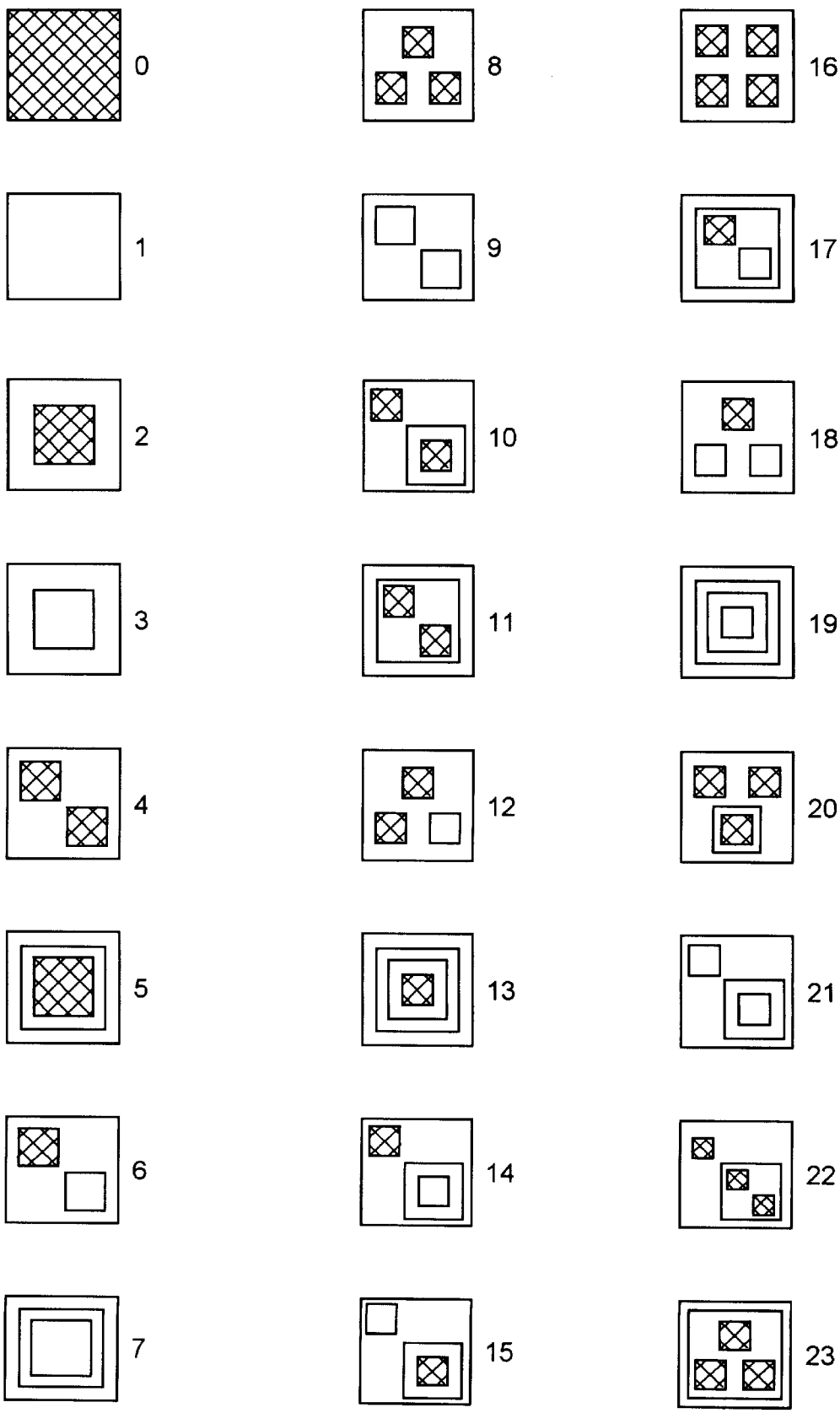
FIG. 6 is a font table according to an embodiment of the invention.

While the standard model of any equationally defined model is normally based upon the equivalence classes of algebraic terms constructable from the syntactic elements of the language itself it is possible to have alternate and more efficient interpretations of the defined equational algebra. We give below the definitions of the four symbols of our language interpreted within the universe of ordered pairs of natural numbers. FIG. 5 shows a sample of 24 Visual Type icons and the square pair representation for the icons. FIG. 6 shows the same icons in numerical order with their respective numerical indexes. FIG. 7 shows a numerical font of the icons. FIGS. 8A–C show the interrelation between the Square Pair or ordered pair notation and other related fonts. The definitions are as follows:

Definition ('c'):
Let c be [0,0];
Definition ('^'):
Let [0,0]^ be [0,0]; Let [1,0]^ be [1,1];
(note that the remainder of the definition of the monadic operation symbol ^ is forced by the definitions of the equational axioms)
Definition ('#'):
Let ([0,0]#[0,0])=[1,0];
Let ([x,y]#[0,0])=[Q(x)*y, 1];
Let ([x,y]#[u,v])=[Q(x)*y, Q(u)*v]; and
Definition ('='):
Let ([x,y]=[u,v]) be true iff y=v=0 and x and y have the same parity or neither y nor v is 0 and Q(x)*y=Q(u)*v.

We close this section by showing how to define the transitive closure of any simple finite multiset or SQUARE PAIR through the use of the recursion inherent in our definitions. To do this we first introduce a factorization notation for natural numbers.

If x is any non-Boolean natural number then [xL, xR] is the ordered pair of natural numbers such that $Q(xL)*xR=x$ where $Q(xL)$ is the smallest prime divisor of x with Q being the monadic Kleene prime enumeration operation defined on the natural numbers. With this notation we can now define the transitive closure TransClos(.) operation:

TransClos([0,0])=[0,0];

TransClos([1,0])=[1,0];

TransClos([x,2y])=[0,1]#TransClos[(x,y)]; and

TranClos([x,y])=[x, TC([xL, xR])*TC([yL, yR])], y not 0

It should be noted that the control allowed by this form of arithmetic processing allows for certain useful optimizations. For example it would be possible to eliminate duplicates during the construction by checking in advance whether the number x as shown in the left hand of an input square pair divides the right hand number y. Other optimizations are also possible.

D. Applications

Application 1 (The Problem of Multiplicative Numerals)

A $0(\log_2(k))$ method for representing natural numbers, k, including zero, as two character sequences that uses concatenation of commutative well formed strings to represent the binary arithmetic operation of multiplication, $x*y$, whenever neither x nor y is zero nor a power of two.

Represent any natural number k as the tree associated with the prime Q(k) concatenated on the right with the single symbol right or ]. Table 2 shows this representation printing the symbol # for each use of the symbol left, [, and the symbol c for each use of right, ]. Note also that each of these concatenate one more symbol to the right strings can be read as a Polish prefix algebraic term interpreting c as a constant symbol and # as a binary operation symbol. See FIGS. 8A–C. It follows from our constructions that if c is interpreted as the natural number zero and # is interpreted as the binary operation defined below that the evaluation of each of the numerical strings arising in this application is its own line number or enumeration number. The efficiency of the new number system is described in column 4 of Table 2.

The Binary operation # is defined for any natural numbers x, y by the recursion:

(0#0)=1;

(x#0)=Q(x), for x not 0; and (x#y)=Q(x)*y, for y not 0.

Application 2 (The Wire Problem)

This application of the general method of representing labeled trees creates an efficient one bit data representation for encoding nonempty sequences of natural numbers, including 0, that is compatible with wire transmission. That is, the method presents a technique for Sender A to uniformly and effectively convert any nonempty sequence of natural numbers into a nonempty sequential pattern of two characters that are input into a wire for Receiver B to receive, or read, one at a time and in the order of A's input, as a code for Sender A's intended natural number sequence input. The method presented then allows Receiver B to effectively determine from the transmitted bits alone, and with no further input from Sender A, the intended sequence of numbers.

All of the transmissions described above are intended to take place between a matched pair of open/close hardware signals, signals whose effect is to open and close the wire channel being used for communication between Sender A and Receiver B.

The encoding presented has two additional very useful features: (A) one of the symbols used in the one bit encoding is a wake up symbol and all natural number codes, including the code for zero, begins with this symbol; and (B), the other symbol, designated as the sleep symbol, is capable of being used pad or fill well formed strings in the normal ways.

That the wire problem has any solution seems unlikely when we pause to realize that this problem has been implicitly known and unsolved for almost 300 years now, or ever since Liebnitz gave us an efficient two bit symbol encoding for the same problem when he published the first published description of the arithmetic of radix base 2 numerical notation.

Using the method of two bit encoding that is so naturally associated with radix base 2 we see that if we use a two bit word length and express our natural numbers as radix base two strings, then a solution for the wire problem is would be to transmit each individual element in the numerical sequence to be coded in radix base 2, reading the two long string '11' as the number or character 1, the two long string '10' as the number or character 0, and reading either or the two long sequence '01' and '01' as the punctuation or spacing mark within the sequence being encoded.

The efficiency of this two bit encoding is a little more than 2 log, or twice as expensive as the cost of adding together the cost of each of the elements in the sequence in radix base 2. This observation, and our intuitive experience with this understanding, allows us to create a reasonable meta measure which we can us as an abstract bench mark for measuring the efficiency of any one bit data representation scheme.

Application 3 (Database Representations)

Vast amounts of information are currently available through computer networks and mass storage. This information is stored and organized in a way that is easily accessible by machines. If one wants to access this information in a highly structured and machine-like way there are methods available to do this efficiently. There is a problem, however, when one attempts to look at information in a more unstructured, inquisitive, and human way. Obtaining a particular piece of information can be difficult and slow. Using this information in a decision making process only adds to the problem. Prime Arithmetics now offers a way to let people determine how information is accessed independent of the machine. Using Prime Arithmetic one can now reshape the way information is viewed to reflect the questions being asked and the purpose for which it is being used. This frees the user to design and build applications using information in a more natural way, freeing computing power to extend, expand, and accelerate those same applications. How does Prime provide this new way of looking at information? For the most part all machine-based information and how it is stored is based on numbers. Numbers, by their very nature, tend to structure information in linear ways. The simplest form of this is the act of counting, "one, two, three, four, five . . . ". Using Prime information storage and usage can be based on form rather than on numbers. Prime uses a computer software system based on a Prime Arithmetics technology, known as The Quill Machine, to do this. The Quill Machine allows information to be looked at as whole structures rather than pieces linked together in a number chain. Instead of sequentially looking through every name in the phone book to answer the question, "how many businesses are in the 3300 to 5500 blocks of main street, have the word "systems" in their name and provide a service?", one can instead imagine reciting some magical incantation, tapping on the phone book and opening it to find all the appropriate businesses marked with a bright red square. The question then becomes "how many bright red squares are there in the phone book". One can see that the latter question, that simply involves adding up the number of red squares in the phone book, is much easier to answer than the former, which would involve looking through most of the phone book and asking the same questions over and over. The red square and the answer to the question it represents is, in effect, a type of information structure that resides hidden in the phone book. Prime gives one the capability of defining and manipulating these structures and the Quill Machine provides the "magical incantation" to make them appear. How does the Quill Machine supply the "magic"? As said previously, the Quill Machine allows information to be viewed as abstract forms or structures. Using the Quill Machine these structures can be used as easily as numbers. When one multiplies 2 with 3 with 5 they are combined into the result, the number 30. Similarly, the Quill Machine allows you to combine the structure representing all the businesses in the phone book, with all businesses that provide a service, with all the listings with addresses between 3300 and 5500, with all the listings on Main, with all the listings with "systems" in the title. The resulting combination is another form or structure, which is then marked with a red square in the example above. The way the Prime Arithmetic is implemented is through three computer systems. These three systems are named the Prime Language Client Object(PLCO), the Prime Language Universal Server (PLUS), and the information server. There is also a type of "postal service" called the Quill Packet Protocol(QPP) that is used to route messages between the PLCO(or multiple PLCO's) and the PLUS(or multiple PLUS's). The information server is where the information resides, like the phone book, in the example above. The PLUS is where differently structured versions of this information are created and where they reside. In the above example this would be like creating the red square markings in the phone book and storing a copy of the phone book that contained only those businesses that got marked with the red square. The PLUS would also contain copies of "the phone book" marked with green squares, blue squares, etc. These would represent other structures or questions that one might want to ask of our "phone book", or information server(or multiple information servers). The PLCO is the system that allows the user to ask those questions in a way that the PLUS can understand and build applications that use the answers. Through these three systems(PLCO, PLUS, and information server) a way of using machine-based information is created that greatly frees the user from machine constraints. The questions then move from "how can I get to the information?", to the more human inquiry, "what is the answer?"

Distributed Applications Using Prime Arithmetics Technology

In the course of using a particular piece of applications software one goes through sequences of inputs to define and execute a particular task. The sequence of operations involved in selecting a particular task usually consists of choosing from menu hierarchies, lists of parameters, and lists of files. One can think of this "trail" of operations as a sequence of numbers that defines the particular task that one is performing within the applications software at a particular time. If these sequences of numbers could be "shared" between two or more users of the same application, on separate machines, in a file sharing, networked environment, these users could avoid conflicting usage and share information as if they were using the same application on the same machine. The effort and computing power needed to create something from such an application would be distributed across multiple users and multiple machines in a more efficient and productive way. The difficulty in creating such a distributed applications comes in the sharing of such sequences. For a complex application these sequences can be quite long making them difficult to rapidly create, transmit, receive and interpret even across even a high speed network. Prime Arithmetics patented technology now allows this problem to be overcome by allowing such a sequence to be expressed as one number and allowing this number to be created, received and interpreted in an extremely rapid way. Our preliminary tests have shown that, even for complex applications, such a number can be created, transmitted, received and interpreted in less than 1 millisecond in an ethernet environment and less than 5 milliseconds with a 14.4 kbps link. This opens new possibilities for distributed applications. Complex applications such as multimedia development and computer-aided design can now be distributed across local area networks to take advantage of lower priced single-user machines and accelerator boards as well as the benefits of parallel development cycles. If development is incremental, so that large amounts of data do not need to be updated at any one time, then the possibility of distributing such applications across low bandwidth connections on the Internet becomes a reality. A user could browse a web server not only to find information, but to be linked to other users in wide area, distributed applications development. Distributed applications development between similar, but different, applications could also be accomplished by means of a "translation table" between the single state-defining numbers describing each users application. Distributed development that was not only cross-platform but cross-application could be accomplished. The code which implements this core technology is small, flexible, and extensible. Using this core technology all applications can extend beyond the constraints of a single machine. Prime Arithmetics technology can both create and define this extension toward new ways of computing.

E. Conclusion

Advantages of the invention include a standard method and apparatus for creating, manipulating, and displaying data structures and container data types. The structures created are adaptable to imitate known data structures and are flexible enough to describe and manipulate new data structures.

Having described the invention, including the best mode, a person skilled in the art will appreciate that various modification can be made to the invention while remaining within the scope of the claims.

What is claimed is:

1. An apparatus for converting and manipulating information comprising:
    an interface circuit configured to receive first information;
    a processor coupled to said interface circuit and configured to receive said first information and to convert said first information to second information made up of at least three symbols including one constant symbol, one unary operation symbol and one binary operation symbol;
    a memory coupled to said processor and configured to store said second information as a table.

2. The apparatus of claim 1, wherein two of said at least three symbols are c and # such that when x, y, z are terms, the symbols satisfy the following constrained equations:

$c' = (c \# c)$;

$x'' = x$;

$(x \# c) = (x \# c'), x \neq c$;

$(x \# y)' = (x' \# y'), x \neq c$ or $y \neq c$; and $(x \# (y \# z)) = (y \# (x \# x)), z \neq c$.

3. The apparatus of claim 1, wherein:
said processor is coupled to a read only memory circuit configured to store a table including a plurality of prime numbers and a unique data structure associated with each prime number, wherein the data structure is a term in the symbols of claim 1.

4. The apparatus of claim 1, wherein:
said processor is coupled to a read only memory circuit configured to store a table including a plurality of prime numbers and a unique data structure associated with each prime number, wherein the data structure is a term in the symbols of claim 2.

5. The apparatus of claim 1, wherein:
said processor is coupled to a memory circuit configured to store a table including a plurality of prime numbers and a unique data structure associated with each prime number wherein the number 2 is associated with the constant symbol, and the number 3 is associated with the unary operation symbol; and a $k^{th}$ prime number, k not being either zero or one, is associated with the binary operation symbol and the constant symbol and a symbol R, when k is twice r and r is associated with R; and the $k^{th}$ prime number, k not being zero or one or even, is associated with the binary operation symbol and a symbol L, when k is the $l^{th}$ prime natural number and l is associated with L; and the $k^{th}$ prime number, k not being either zero or one or even or prime, is associated with the binary operation symbol and the symbols L and R, when k is the $l^{th}$ prime natural number multiplied by r, and l is associated with L and r is associated R.

\* \* \* \* \*